(12) United States Patent
Rudowicz et al.

(10) Patent No.: US 7,263,365 B2
(45) Date of Patent: Aug. 28, 2007

(54) RECEPTION METHOD AND APPARATUS

(75) Inventors: Michael Rudowicz, Lake Worth, FL (US); Alfred Wieczorek, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 1107 days.

(21) Appl. No.: 10/413,060

(22) Filed: Apr. 14, 2003

(65) Prior Publication Data

US 2004/0203830 A1    Oct. 14, 2004

(51) Int. Cl.
*H04Q 7/20*    (2006.01)
(52) U.S. Cl. ............................. 455/452.2; 455/452.1; 455/450

(58) Field of Classification Search ................ 455/450, 455/452.1, 452.2
See application file for complete search history.

(56) References Cited

U.S. PATENT DOCUMENTS

| | | | | |
|---|---|---|---|---|
| 5,134,707 | A * | 7/1992 | Sakashita et al. | 455/3.02 |
| 5,745,532 | A * | 4/1998 | Campana, Jr. | 375/347 |
| 7,212,542 | B2 * | 5/2007 | Khawand | 370/464 |
| 2003/0009765 | A1 * | 1/2003 | Linden et al. | 725/95 |

* cited by examiner

*Primary Examiner*—Creighton Smith

(57) ABSTRACT

Receiver bandwidth is dynamically altered during operation (with respect to, for example, filter bandwidth and/or filter center frequency) as a function, at least in part, of communication resource allocation.

17 Claims, 2 Drawing Sheets

RECEPTION METHOD AND APPARATUS

FIELD OF THE INVENTION

The present invention relates generally to receiver performance.

BACKGROUND OF THE INVENTION

Communication systems are well known and comprise many types including land mobile radio, cellular radiotelephone, and personal communication systems to name a few. Within a communication system, transmissions are conducted between a transmitting device and a receiving device over a communication resource, commonly referred to as a communication channel. To date, the transmissions have typically consisted of voice signals. More recently, however, there has been rapidly growing interest in carrying other forms of signals, including high-speed packetized data signals that are suitable for video, audio, and other high bandwidth data applications.

Because of the increase in demand for data communications services, such as Internet services like access to the World Wide Web, the size of data messages and their frequency of transmission have increased and take longer to transfer on existing communication systems. New and/or proposed cellular radio systems, including those based on technologies such as time division multiplexing, frequency division multiplexing, and/or code division multiplexing, allow the data rate available to an individual mobile station to be changed on demand to better accommodate such needs as they arise. This is done in frequency division multiplexed/time division multiplexed systems by allocating a larger number of time division slots and/or carrier (or sub-carrier) frequencies per unit time to the particular user requiring greater throughput. In code division multiple access systems, a greater number of spreading codes are assigned to the user requiring greater throughput.

In such systems, one or more wideband frequency domain channels (having, for example, 50 KHz, 100 KHz, or 150 KHz bandwidths) are subdivided in time and/or code domains into smaller logical channels (some of which can be used for control purposes to dynamically inform the mobile station during operations of the logical channels to be used by the mobile stations). In many systems, the wideband frequency domain channel is first subdivided into narrower frequency domain sub-carriers, which sub-carriers are then similarly subdivided with respect to time and/or codes to yield the desired logical channels.

Unfortunately, when a mobile station, such as a cellular telephone handset, receives, for example, a wide-band time division multiple access (TDMA) transmission on a 100 KHz system, the mobile station is presently required to receive and decode the entire 100 KHz bandwidth of the wideband frequency domain channel to obtain and decode the desired data, regardless of whether the specific assignment for that mobile station only requires receipt of data as carried on a subset of the sub-carriers that constitute the wideband channel. Thus, even if the mobile station is assigned only 50 KHz of the total available bandwidth, the mobile station must nevertheless unnecessarily receive and decode the remaining bandwidth. This results in extra current drain and therefore reduced battery life for a portable device. These circumstances also significantly impact receiver sensitivity as noise contributions that correspond to reception and processing of the full bandwidth channel necessarily impact reception and processing of that portion of the full bandwidth channel that contains the data of interest.

BRIEF DESCRIPTION OF THE DRAWINGS

The above needs are at least partially met through provision of the reception method and apparatus described in the following detailed description, particularly when studied in conjunction with the drawings, wherein.

Figure 1:
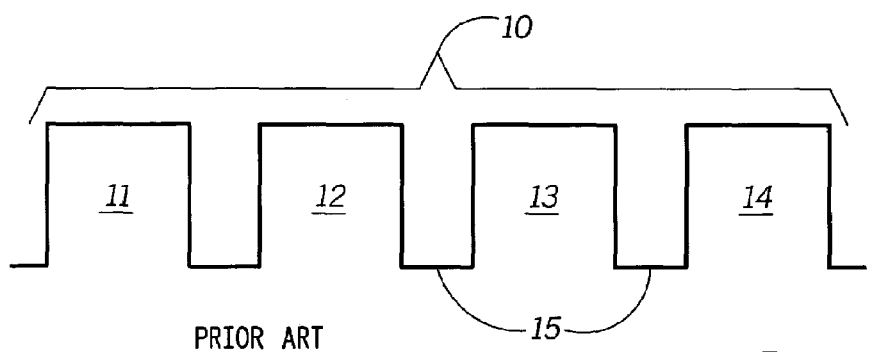
FIG. 1 comprises a prior art frequency-domain representation of a wideband channel comprised of four sub-carriers.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Pursuant to these various embodiments, at least a portion of a wideband frequency domain channel (comprised in a preferred embodiment of a plurality of sub-carriers) is monitored for reception of control information that identifies at least one specific sub-carrier. This specific sub-carrier (or sub-carriers) is then subsequently used by the mobile station to receive data (such as, for example, a user payload). Pursuant to a preferred embodiment, receiver bandwidth for the mobile station is dynamically adjusted during operation as a function, at least in part, of this control information. In particular, the receiver bandwidth is adjusted to facilitate reception of the relevant data while excluding reception of at least some other portion of the wideband channel (such as, for example, another sub-carrier) that is not to carry the relevant data.

In a preferred embodiment, such dynamic alteration of the receiver bandwidth can involve modification of the corresponding receiver bandwidth center frequency, receiver filter bandwidth, or both.

So configured, the mobile station receiver is dynamically adjusted during operation to receive only a portion of the available wideband channel (that is, the portion containing the assigned sub-carrier, for example). As a result, the influence of noise due to non-received portions of the wideband channel is considerably reduced, thereby extending the effective sensitivity and range of the mobile station. For example, when the receiver bandwidth is changed from 100 kHz to 50 kHz, only half the noise is integrated, thereby realizing an improvement of 3 dB in the corresponding signal to noise ratio. Also, the processing requirements to support subsequent decoding are reduced as well, thereby reducing overall power needs and permitting extended battery life.

In a known TDMA/FDMA system, such as the iDEN system available from Motorola, Inc. of Schaumburg, Ill., there is provided a 25 KHz carrier that has four sub-channels inside of that carrier, such that each one of those sub-channels is 4.5 KHz apart. In addition, each sub-channel occupies 18 KHz of the 25 KHz carrier, with a guardband on each side. In contrast, in a typical exemplary wideband FDMA/TDMA system, a 100 KHz wideband channel 10 is subdivided with respect to frequency to yield four sub-carriers 11-14 (typically, a guardband 15 serves to separate the sub-carriers from one another in a so-called non-contiguous configuration).

Figure 2:
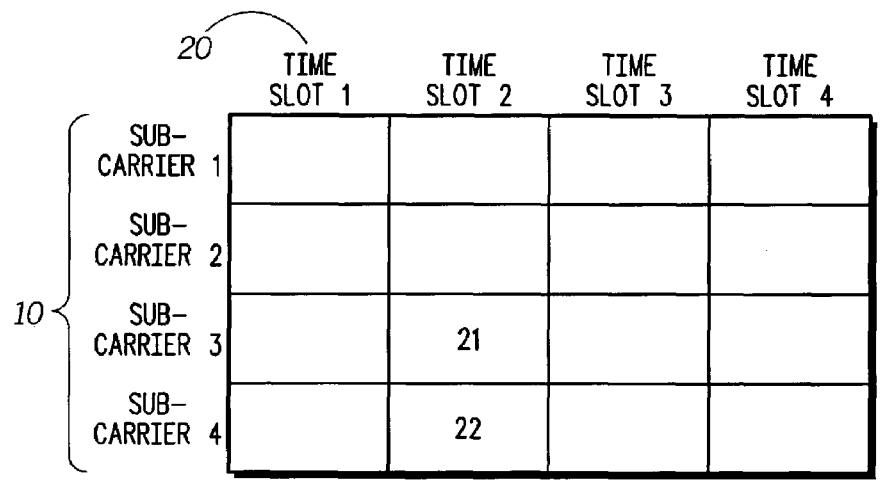
FIG. 2 comprises a chart depicting prior art time-based logical channels.

In many systems these sub-carriers are further partitioned with respect to time to create time slots. To illustrate this concept, FIG. 2 depicts each sub-carrier of the wideband channel 10 as being divided by time into four time slots (where, for example, these four time slots together comprise a frame of information).

Control information, such as signaling intended to instruct a given mobile station as to which sub-carrier(s) and/or time slot(s) are to be used for transmission and/or reception purposes is usually provided on some periodic basic. Control information can be provided, for example, on one or more sub-carriers within a given time slot 20 to instruct a given mobile station to receive data during time slot 2 on sub-carriers 3 and 4 (as denoted by reference characters 21 and 22). In such an example, this same time slot/sub-carrier relative position can continue to provide such control information with each frame cycle. As another example, control information can be more widely distributed over the various time slots and/or sub-carriers (either to supplement the dedicated control information time slot described above or in lieu thereof as desired and/or as appropriate to the needs of a given application).

In a communication system that supports a dynamic allocation of transmission and/or reception resources to facilitate a given communication, such control information can include an identification of a plurality of sub-carriers that are assigned to support a given communication. For example, a given mobile station may be temporarily assigned sub-carriers 2, 3, and 4 to permit a more rapid downloading of a particular data file.

In some embodiments, the control information slot provides control information that informs a given mobile station of the particular time slots and sub-carriers that the mobile station should receive and decode in the next N*twenty-four time slots (where, for example, N=1, 2, or 3). This provides a type of control information schedule to which the mobile station can synchronize itself to facilitate power saving functionality when so desired.

In general, such communications systems and resource allocation schemes are well understood in the art. Therefore, no additional description will be provided here for the sake of brevity and the preservation of focus.

Figure 3:
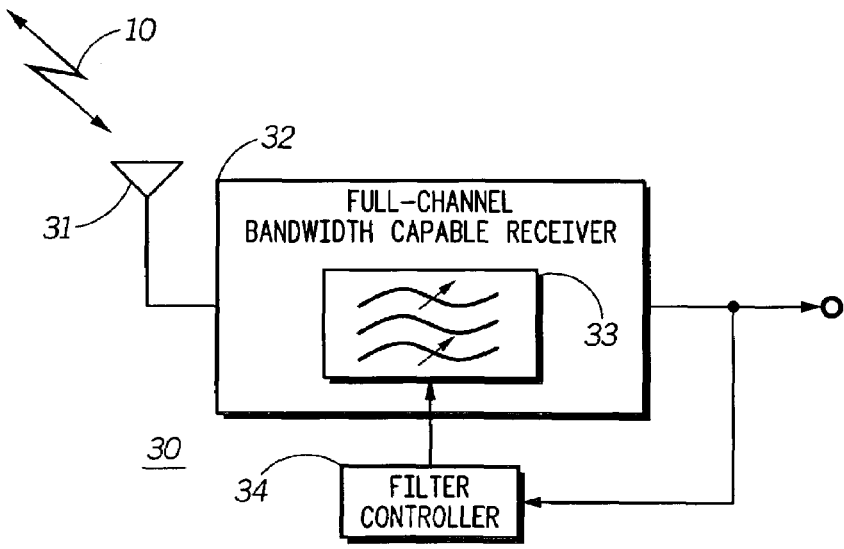
FIG. 3 comprises a block diagram of a mobile station as configured in accordance with an embodiment of the invention.

Pursuant to a preferred embodiment, to facilitate a dynamic filter bandwidth alteration in response to such resource allocation instructions, a mobile station 30 (FIG. 3) includes an antenna 31 that couples to a full-channel bandwidth capable receiver 32. That is to say, the receiver 32 is fully capable of receiving the full bandwidth of the communication system's wideband channel 10 such that all sub-carriers can be simultaneously received. This receiver 32 also includes, however, an adjustable receiver filter 33 comprised, in this embodiment, of a bandwidth filter wherein the bandwidth of the filter can be selectively narrowed or widened and/or the center frequency of the bandwidth filter can be selectively moved. So configured, a filter controller 34 (responding, for example, to resource allocation information as received by the receiver 32) can modify the characteristics and performance of the adjustable receiver filter 33 to permit reception (and subsequent decoding) of part, but not all, of the total wideband channel to thereby reduce noise and to further reduce decoding processing requirements. In particular, the filter controller 34 can adjust at least one of the filter bandwidth and the filter center frequency of the adjustable receiver filter 33 to permit inclusion of sub-carriers that are assigned to the mobile station and to exclude, at least in part, other sub-carriers that comprise other portions of the wideband frequency domain channel 10.

Figure 4:
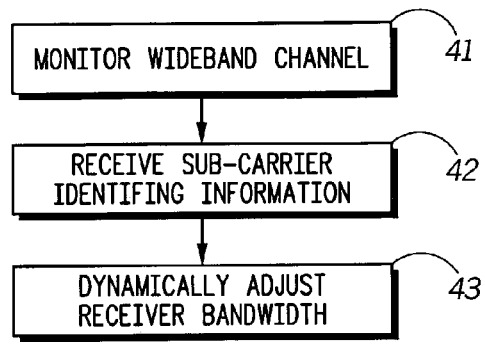
FIG. 4 comprises a flow diagram as configured in accordance with an embodiment of the invention.

So configured, and referring now to FIG. 4, the mobile station 30 can monitor the wideband channel 41 (or some reduced portion thereof when control information comprising resource allocation instructions are known to be periodically presented in a particular sub-portion thereof) in order to receive 42 information that identifies the resource, such as a specific sub-carrier (or sub-carriers) that have been assigned to convey data to the mobile station. The mobile station 30 can then utilize that resource allocation information to dynamically adjust 43 its own receiver bandwidth to facilitate reception of the relevant data while excluding reception of at least some portion of the total available resource (such as, for example, at least one sub-carrier) that will not carry the relevant data. In a preferred embodiment, the mobile station 30 receives in particular dynamic channel allocation procedure signaling that identifies at least one logical channel (such as, for example, a temporal logical channel or a coded logical channel) as supported by a corresponding specific sub-carrier that will bear the relevant data and then uses this information to inform the above-described dynamic adjustment of receiver bandwidth during operations.

Figure 5:
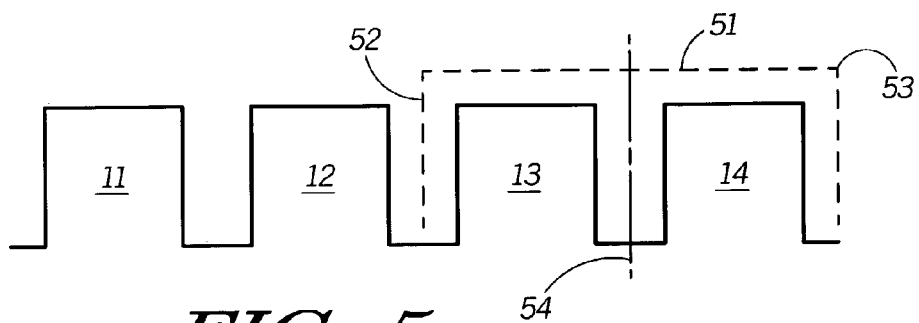
FIG. 5 illustrates a first example as configured in accordance with an embodiment of the invention.

As an illustration of this approach, and referring now to FIG. 5, a given mobile station may be assigned two sub-carriers 13 and 14 to support a given communication. The bandwidth 51 of the mobile station receiver is adjusted to accommodate these two sub-carriers 13 and 14 while substantially excluding the remaining two sub-carriers 11 and 12. As a part of this bandwidth adjustment, preferably both the low and high frequency skirts 52 and 53 of the bandwidth filter are adjusted as is the center frequency 54 of the bandwidth filter to facilitate this result. So configured in response to the resource allocation information, the receiver filter substantially includes the allocated sub-carriers 13 and 14 while substantially excluding the non-allocated sub-carriers 11 and 12.

Figure 6:
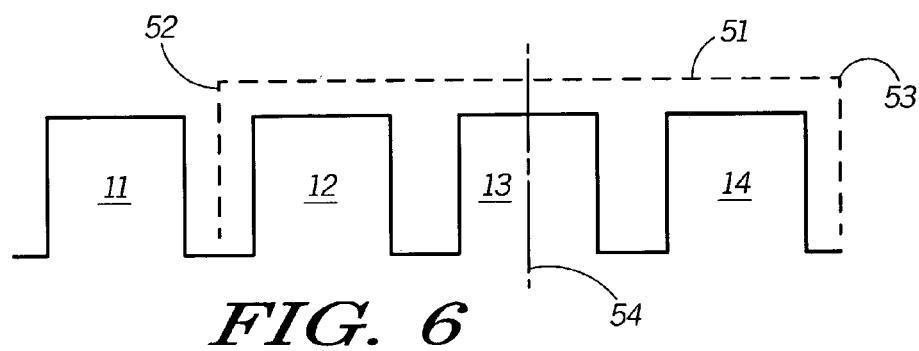
FIG. 6 illustrates a second example as configured in accordance with an embodiment of the invention.

As another illustration, and referring now to FIG. 6, the mobile station may instead be temporarily and dynamically allocated three of the available sub-carriers 12, 13, and 14. The skirts 52 and 53 of the bandwidth filter characteristics 51 and the center frequency 54 are dynamically altered in this instance to substantially include these three allocated sub-carriers 12, 13, and 14 while substantially excluding the non-allocated sub-carrier 11.

Figure 7:
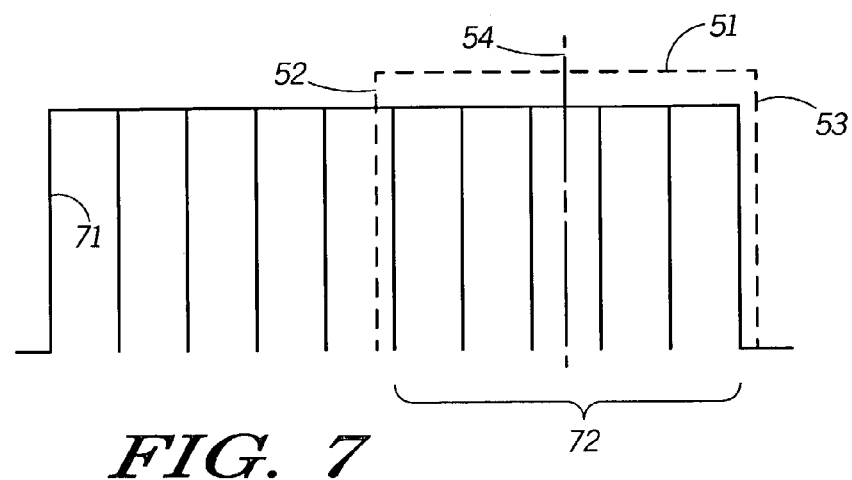
FIG. 7 illustrates a third example as configured in accordance with an embodiment of the invention.

In both examples provided above, the sub-carriers are parsed in a non-contiguous manner. In some systems, however, the parsing results in contiguous (or substantially contiguous) sub-carriers. These teachings are applicable to contiguous sub-carriers in substantially the same fashion. To illustrate, and referring now to FIG. 7, a given wideband channel may be partitioned into ten contiguous sub-carriers 71. If a mobile station is allocated five contiguous sub-carriers 72 to serve the needs of a given communication, the bandwidth characteristics can be modified such that the skirts 52 and 53 of the filter and the center frequency 54 thereof permit inclusion of the allocated sub-carriers 72 while substantially again excluding the non-allocated resources.

These various embodiments tend to improve mobile station outbound channel sensitivity. That is, the improvement is realized from the base transceiver station of the base station to the mobile unit. Advantageously, such benefits are not limited by the manner in which the spectrum is allocated.

As a specific illustrative example, a mobile station can begin by receiving on a predetermined packet data channel using the entire allocated 100 KHz bandwidth of a corresponding communication system's wideband channel. After receiving control information that identifies the individual sub-carriers to be used for a given communication, the mobile station determines and appropriately sets the channel selectivity filter bandwidth and center frequency. In particular, the mobile station adjusts the receiver selectivity filter bandwidth and center frequency to match and accommodate the sub-carriers that have been assigned to the mobile station.

This constitutes a dynamic process and may be done, for example, for each time slot to be received. If desired, the mobile station can synchronize to the set of sub-carriers it has selected by using matched filter patterns. Thus, as long as there is more than one sub-carrier or channel present within the total accommodated bandwidth, the mobile station selectively decodes the transported payload.

In an exemplary mode of operation, the mobile station can be assigned a variable bandwidth that depends on the data read rate required (or desired) for the particular application being executed. For example, the mobile station could be assigned a variable data rate with the data rate utilized being dependent on whether packet data or streaming audio is being executed. The data rate in turn can correlate to a particular quantity of system resources. Thus, the application can dictate what resources the mobile station is going to be assigned in terms of the number of sub-carriers and logical channels (such as time slots).

It can therefore been seen that these various embodiments permit significant improvements with respect to sensitivity and decoding processing requirements when less than all of an available wideband channel currently serves the needs of a given mobile station. Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising the steps of:
   monitoring at least a portion of a wideband frequency domain channel comprised of a plurality of sub-carriers;
   receiving control information identifying at least one specific sub-carrier as carrying relevant data;
   dynamically adjusting receiver bandwidth during operation as a function, at least in part, of the control information identifying the at least one specific sub-carrier to facilitate reception of the relevant data while excluding reception of at least one sub-carrier that is not carrying the relevant data.

2. The method of claim 1 wherein monitoring at least a portion of a wideband frequency domain channel includes monitoring a plurality of sub-carriers.

3. The method of claim 2 wherein monitoring a predetermined sub-carrier includes monitoring at least one predetermined sub-carrier comprised of a plurality of logical channels, wherein at least one of the plurality of logical channels facilitates the conveyance of dynamic channel allocation procedure signaling.

4. The method of claim 3 wherein receiving control information identifying at least one specific sub-carrier as carrying relevant data includes receiving dynamic channel allocation procedure signaling that identifies the at least one specific sub-carrier that will bear the relevant data.

5. The method of claim 4 wherein receiving dynamic channel allocation procedure signaling that identifies the at least one specific sub-carrier that will bear the relevant data includes receiving dynamic channel allocation procedure signaling that identifies at least one logical channel as supported by the at least one specific sub-carrier that will bear the relevant data.

6. The method of claim 1 wherein dynamically adjusting receiver bandwidth during operation includes dynamically adjusting at least one of:
   receiver bandwidth center frequency; and
   receiver filter bandwidth.

7. The method of claim 1 wherein dynamically adjusting receiver bandwidth during operation includes dynamically adjusting both:
   receiver bandwidth center frequency; and
   receiver filter bandwidth.

8. The method of claim 1 wherein receiving control information identifying at least one specific sub-carrier as carrying relevant data includes receiving control information identifying at least one temporal logical channel of the at least one specific sub-carrier as carrying the relevant data.

9. The method of claim 1 wherein receiving control information identifying at least one specific sub-carrier as carrying relevant data includes receiving control information identifying at least one coded logical channel of the at least one specific sub-carrier as carrying the relevant data.

10. A method for improving performance in a mobile station, the method comprising the steps of:
    receiving a signal that identifies at least one specific sub-carrier of a carrier, which specific sub-carrier comprises less than all candidate bandwidth as corresponds to the carrier;
    setting a carrier selectivity filter bandwidth based on the at least one specific sub-carrier; and
    setting a carrier selectivity filter center frequency based on the at least one specific sub-carrier.

11. The method of claim 10 wherein receiving a signal that identifies at least one specific sub-carrier of a carrier includes receiving a signal that identifies a plurality of the sub-carriers to provide allocated sub-carriers.

12. The method of claim 11 wherein setting a carrier selectivity filter bandwidth based on the at least one specific sub-carrier includes setting a carrier selectivity filter bandwidth that will substantially include the allocated sub-carriers while substantially excluding at least one non-allocated sub-carrier.

13. The method of claim 12 wherein setting a carrier selectivity filter center frequency includes setting the carrier selectivity filter center frequency at an approximate center frequency of the allocated sub-carriers.

14. The method of claim 12 wherein setting a carrier selectivity filter bandwidth includes setting a bandwidth that is less than the candidate bandwidth as corresponds to the carrier.

15. A mobile station usable in a wireless communication system that facilitates communications using a wideband frequency domain channel having a corresponding full-channel bandwidth that is comprised of a plurality of sub-carriers, wherein at least some of the sub-carriers are further sub-divided into logical channels, the mobile station comprising:
- a full-channel bandwidth capable receiver;
- an adjustable receiver filter operably coupled to the receiver;
- a filter controller having a control output operably coupled to the adjustable receiver filter and an assigned sub-carriers information input operably coupled to the receiver, such that the filter controller dynamically adjusts the receiver filter to substantially match bandwidth requirements that correspond to sub-carriers as assigned to the mobile station while substantially excluding reception of at least one sub-carrier to thereby dynamically limit the receiver to less than full-channel bandwidth reception when possible.

16. The mobile station of claim 15 wherein the filter controller includes filter adjustment means for adjusting at least one of:
- bandwidth; and
- center frequency;

of the adjustable receiver filter to include sub-carriers as assigned to the mobile station and to exclude, at least in part, other sub-carriers that comprise the wideband frequency domain channel.

17. The mobile station of claim 16 wherein the logical channels comprise temporally-based logical channels, and wherein the assigned sub-carriers information is provided on a periodic basis, such that the filter adjustment means at least considers dynamically adjusting the receiver filter as a function of periodicity of the periodic basis.

* * * * *